United States Patent [19]

Harris et al.

[11] Patent Number: 5,020,815

[45] Date of Patent: Jun. 4, 1991

[54] SELF-PROPELLED, STEERABLE WHEELCHAIR

[75] Inventors: Godfrey Harris, Littleton, Colo.; Ralph B. Noell, Ajo, Ariz.; Larry R. Bradshaw, Arvada, Colo.

[73] Assignee: Scott Orthotic Labs, Inc., Arvada, Colo.

[21] Appl. No.: 422,620

[22] Filed: Oct. 17, 1989

[51] Int. Cl.[5] .......... B62M 1/14

[52] U.S. Cl. .......... 280/246; 280/250.1; 280/304.1; 280/270; 297/DIG. 4; 74/421 R; 74/142; 74/498

[58] Field of Search .......... 280/250.2, 242.1, 244, 280/246, 248, 263, 92, 266, 304.1, 47.11, 62, 270; 180/333, 907; 297/DIG. 4; 74/421 R, 142, 594.2, 498

[56] References Cited

U.S. PATENT DOCUMENTS

| | | | |
|---|---|---|---|
| 654,986 | 7/1900 | Krueger | 74/143 |
| 1,625,886 | 4/1927 | Felton | 280/92 |
| 2,130,426 | 9/1938 | Henderson | 280/244 |
| 2,643,898 | 6/1953 | Everest | 280/240 |
| 2,786,436 | 3/1957 | Arnot | 280/92 X |
| 3,189,368 | 6/1965 | Peterson | 280/242 |
| 3,921,744 | 11/1975 | Benoit et al. | 180/13 |
| 4,316,616 | 2/1982 | Boivin | 280/289 |
| 4,354,691 | 10/1982 | Saunders et al. | 280/242 |
| 4,358,126 | 11/1982 | Mitchell et al. | 280/242 |
| 4,453,729 | 6/1984 | Lucken | 280/242 |
| 4,471,972 | 9/1984 | Young | 280/289 |
| 4,503,724 | 3/1985 | Ward | 74/143 |
| 4,506,900 | 3/1985 | Korosue | 280/242 |
| 4,560,181 | 12/1985 | Herron | 280/242 |
| 4,586,723 | 5/1986 | Nabinger | 280/242 |
| 4,652,026 | 3/1987 | Byrge | 280/242 |
| 4,682,784 | 7/1987 | Anderson | 280/242 |
| 4,762,332 | 8/1988 | Scol | 280/244 X |
| 4,865,344 | 9/1989 | Romero, Sr. et al. | 74/142 X |

FOREIGN PATENT DOCUMENTS

| | | |
|---|---|---|
| 2227851 | 11/1974 | France . |
| 2563170 | 4/1984 | France . |

*Primary Examiner*—Charles A. Marmor
*Assistant Examiner*—Mitchell Bompey
*Attorney, Agent, or Firm*—W. Scott Carson

[57] ABSTRACT

A retrofitable attachment for easily and quickly converting most conventional wheelchairs into self-propelled, steerable wheelchairs. The invention includes a drive arrangement easily attachable to one of the rear wheels of the wheelchair, an elongated arm unit easily attachable adjacent one of the front casters of the wheelchair, and a connecting member extending between the arm and rear drive arrangement. The elongated arm unit has an outer drive arm portion and an inner steering arm portion, both of which are mounted for pivotal movement together about a first axis to activate the drive arrangement. Additionally, the occupant of the wheelchair can twist or rotate the inner steering arm position about a second axis to steer the front caster of the wheelchair. The steering arrangement further includes a unique gearing system that eliminates dead spots in the steering and allows for easy and uniform manipulation of the steering arm and front caster. In use and with a single hand, the occupant of the chair can both propel and steer the wheelchair as desired.

31 Claims, 9 Drawing Sheets

1
3
4
5
7
9
11
13
15
17
21
23
47
49
84
90
2
3

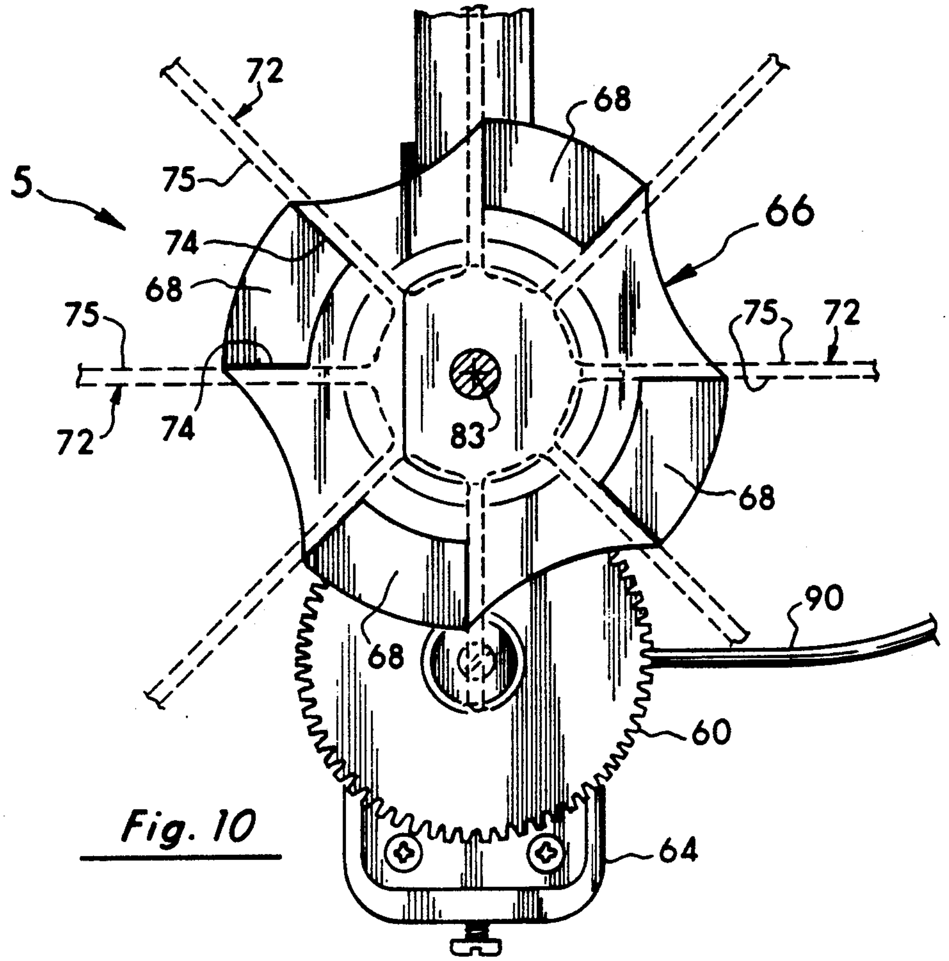
Fig. 10
Fig. 12
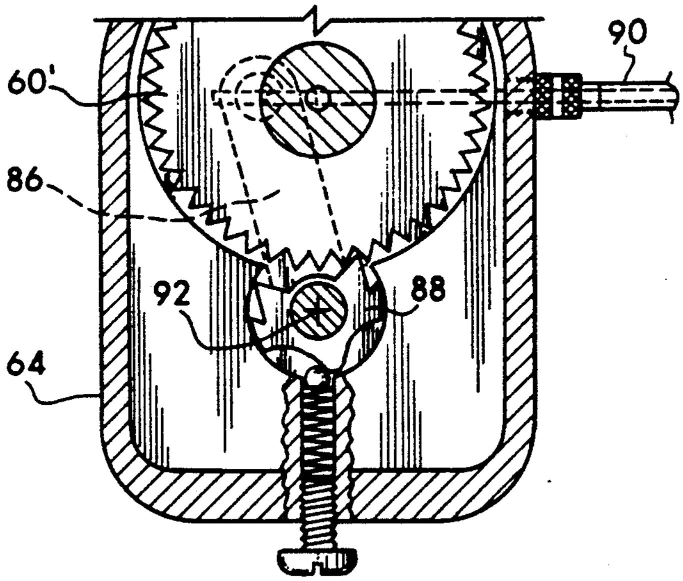

9

15
82
7
80
72
5
75
66
68
62
76
83
78
83
64
12
68
75
86
60'
72
92
88
60
12

SELF-PROPELLED, STEERABLE WHEELCHAIR

BACKGROUND OF THE INVENTION

1. Field of the Invention

This invention relates to the field of wheelchairs and more particularly to the field of self-propelled, steerable wheelchairs that are operable by manipulation of a single arm or lever.

2. Discussion of the Background

Several self-propelled, steerable wheelchairs are commercially available which are operable by manipulating a single arm or lever; however, virtually all of them must be specially made at the factory and are considerably more expensive than conventional wheelchairs. Additionally, such arrangements either cannot or cannot easily be retrofitted onto existing wheelchairs of conventional design without considerable modifications and expense. Some attempts have been made to provide easily retrofitable designs for conventional wheelchairs but to date, none has been successful.

With this in mind, the present invention was developed. With it, the most common and popular designs of conventional wheelchairs can be easily and quickly converted to self-propelled, steerable wheelchairs at relatively low cost and with very few modifications to the wheelchair itself.

SUMMARY OF THE INVENTION

This invention involves a retrofitable attachment for easily and quickly converting most conventional wheelchairs into self-propelled, steerable wheelchairs. The invention includes a drive arrangement easily attachable to one of the rear wheels of the wheelchair, an elongated arm unit easily attachable adjacent one of the front casters of the wheelchair, and a connecting member extending between the arm and rear drive arrangement. The elongated arm unit has an outer drive arm portion and an inner steering arm portion, both of which are mounted for pivotal movement together about a first axis to activate the drive arrangement. Additionally, the occupant of the wheelchair can twist or rotate the inner steering arm portion about a second axis to steer the front caster of the wheelchair.

The drive arrangement is retrofitable to one of the rear wheels by a simple hub arrangement and the steering arm is retrofitable to one of the front casters by a gear box that easily mounts to the existing structure of the chair. The drive arrangement is reversible by a control that is also mounted on the elongated arm unit so that with a single hand, the occupant of the chair can both propel and steer the chair. The drive arrangement further includes an easily operated ratchet system and the steering arrangement further includes a unique gearing system that eliminates dead spots in the steering and allows for easy and uniform manipulation of the steering arm and front caster.

BRIEF DESCRIPTION OF THE DRAWINGS

FIG. 10 is a view showing the rear hub member that attaches to the rear wheel of the chair.

FIG. 12 is a view along 12—12 of FIG. 11.

DETAILED DESCRIPTION OF THE PREFERRED EMBODIMENTS

Figure 1:
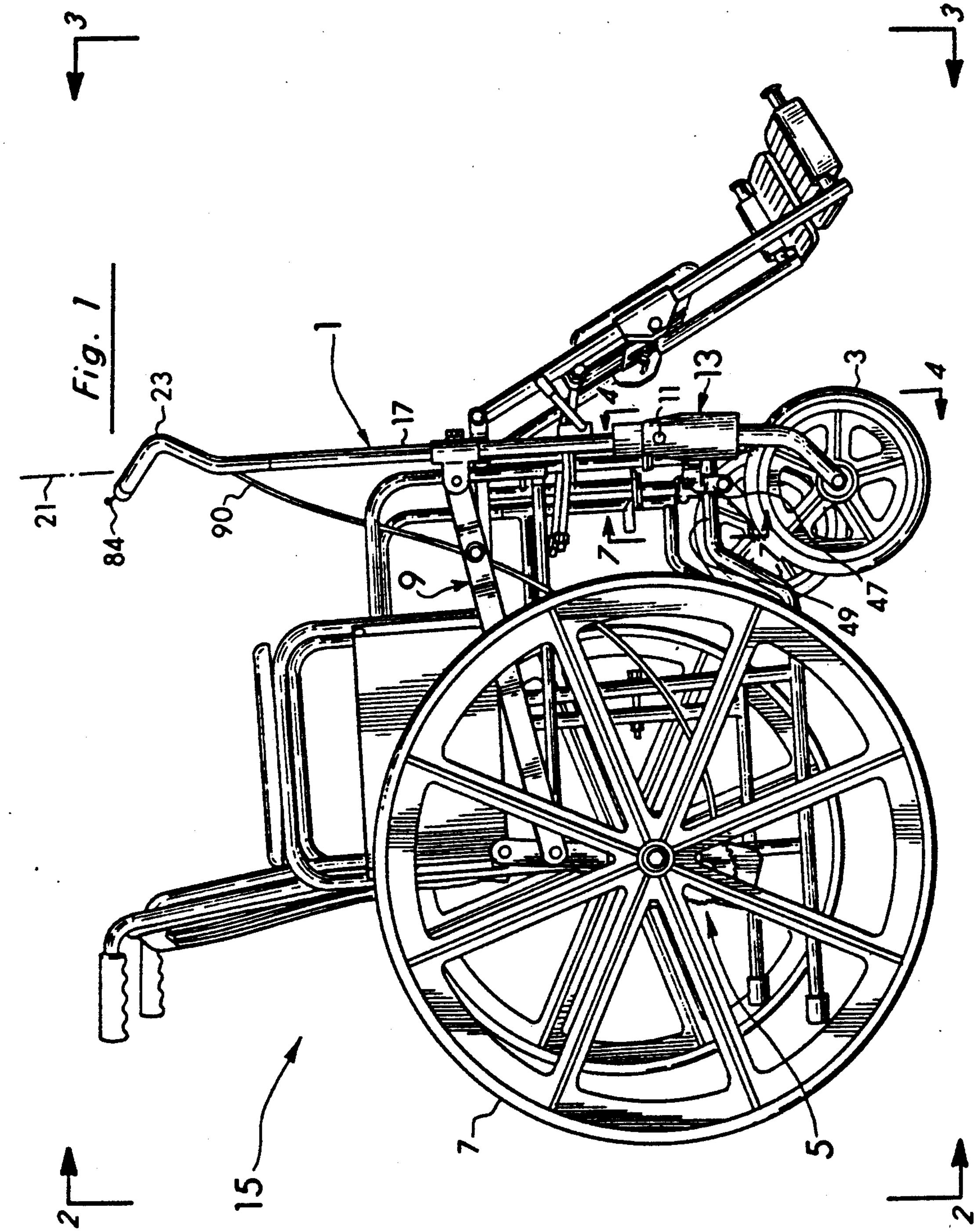
FIG. 1 is a side view of a conventional wheelchair retrofitted with the present invention.
Figure 2:
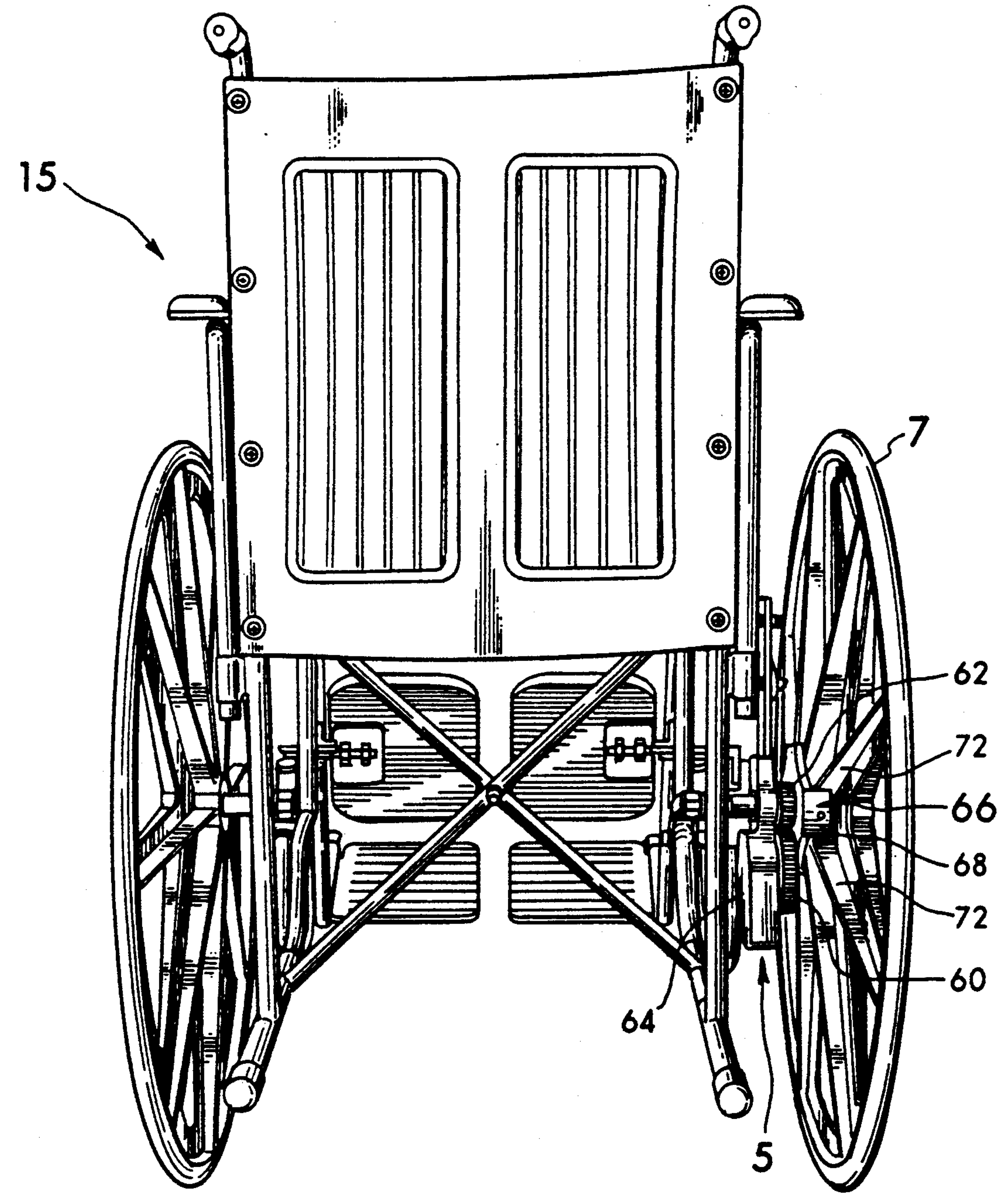
FIG. 2 is a rear view of the wheelchair along line 2—2 of FIG. 1 showing the retrofitted drive arrangement of the present invention attached to the right rear wheel.

As best seen in FIGS. 1 and 2, the retrofitable attachment of the present invention includes an upright, elongated arm unit 1 (see FIG. 1) mounted adjacent the front caster 3, rear drive arrangement 5 (see FIGS. 1 and 2) mounted on the rear wheel 7, and connecting member 9 (see FIG. 1) extending between the arm 1 and drive arrangement 5.

Figure 3:
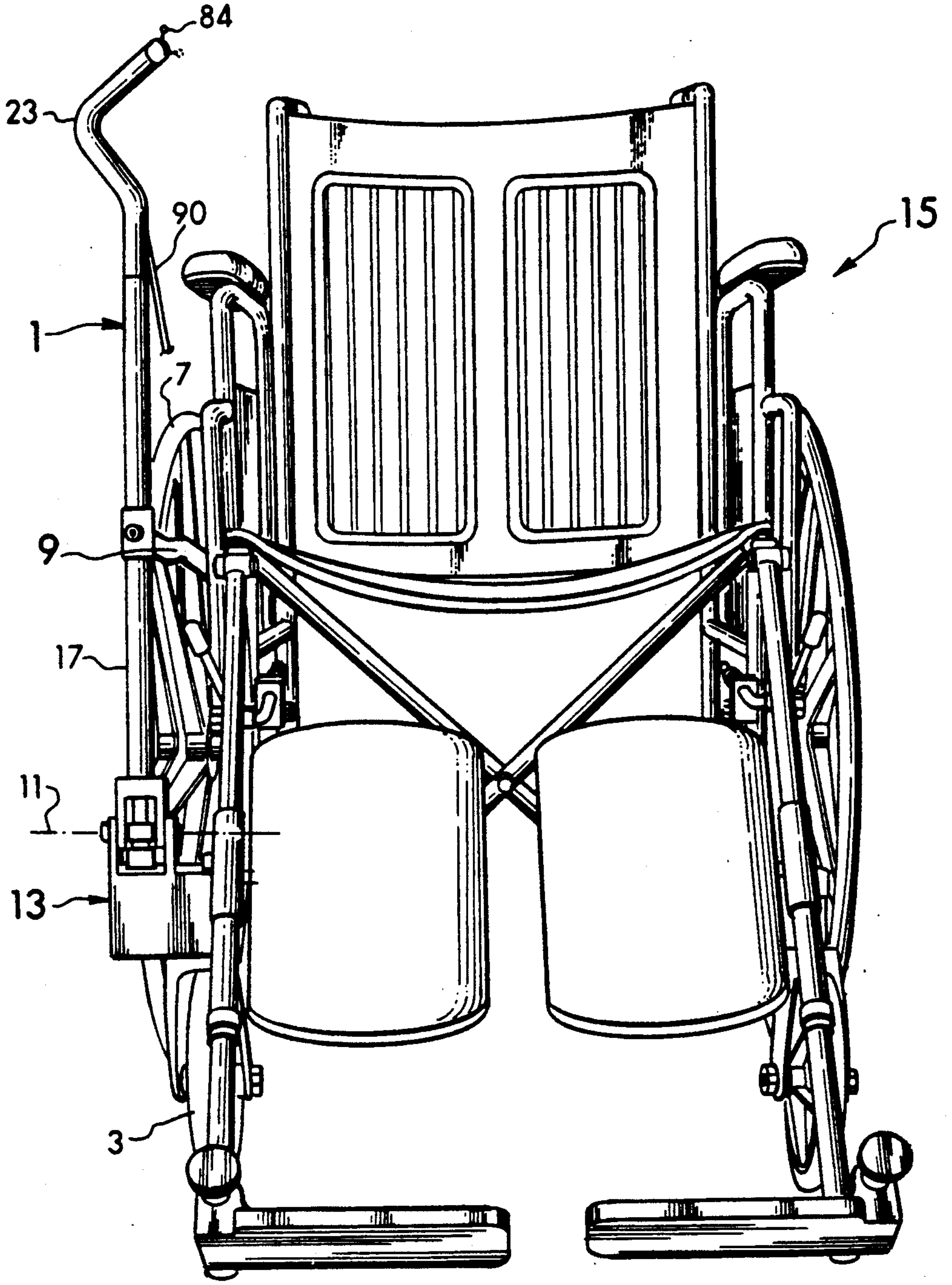
FIG. 3 is a front view of the retrofitted wheelchair taken along line 3—3 of FIG. 1.
Figure 4:
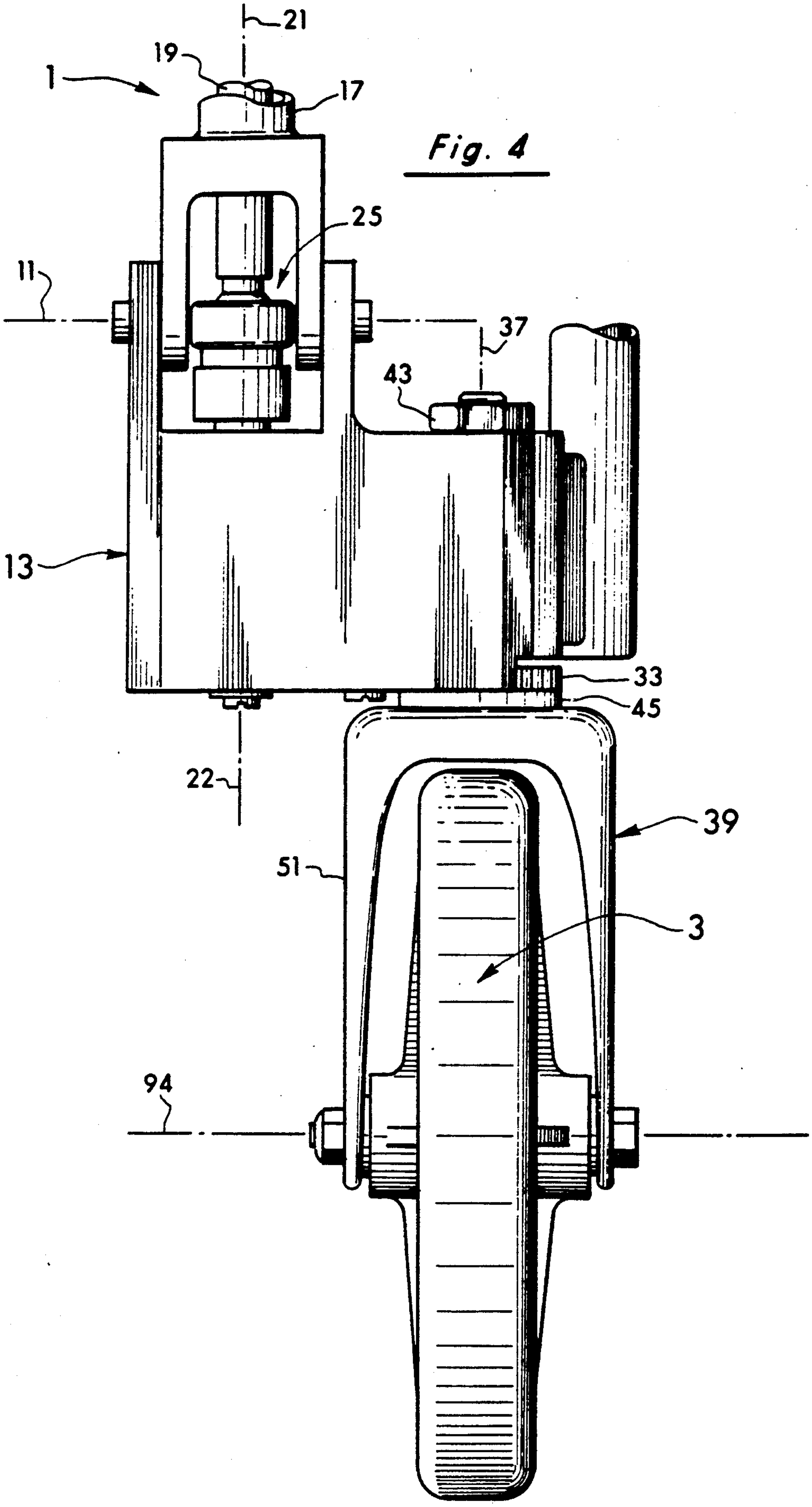
FIG. 4 is a view along line 4—4 of FIG. 1.
Figure 5:
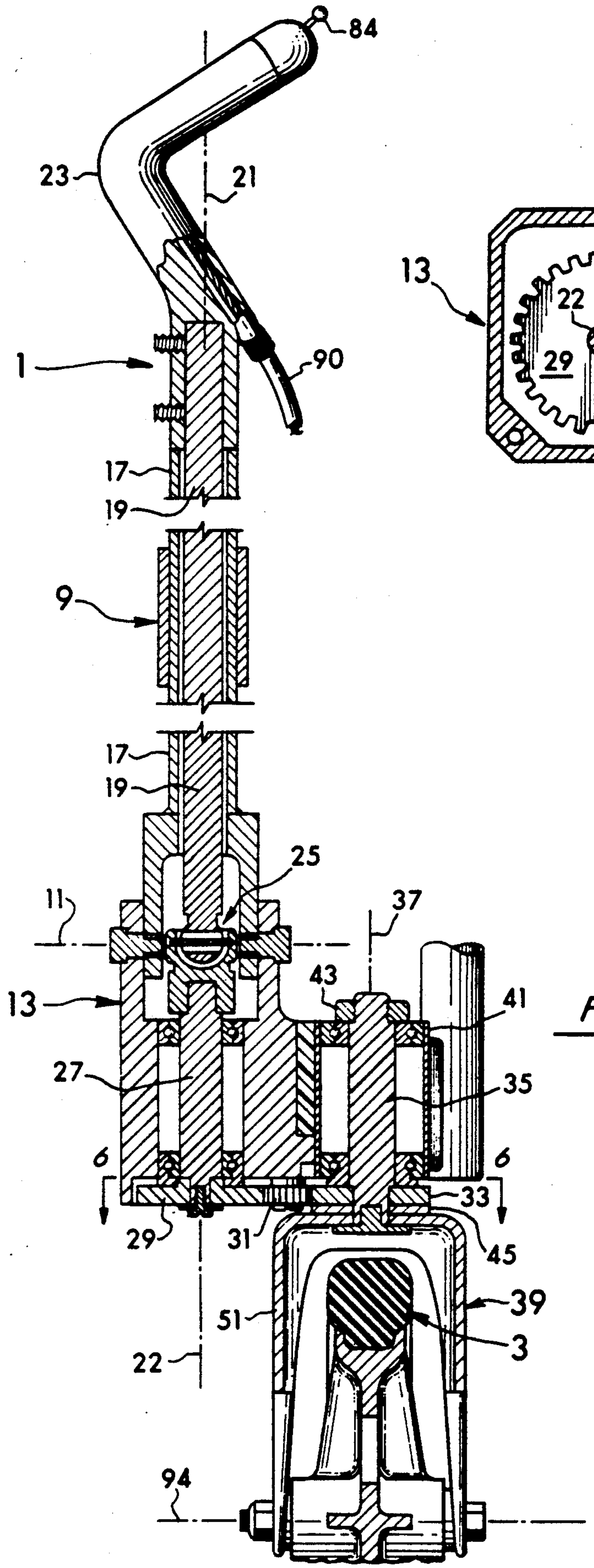
FIG. 5 is a sectional view of the elongated arm unit and gear box of the steering arrangement for the front caster of the wheelchair.

The elongated arm unit 1 (see FIG. 1) is mounted at 11 to a gear box 13 for pivotal or reciprocating movement back and forth about the axis 11 relative to the frame of the wheelchair 15. This feature is also illustrated in FIGS. 3–5. As best seen in FIG. 5, the arm unit 1 actually consists of an outer or drive arm portion 17 and an inner or steering arm portion 19. Both arm portions 17 and 19 pivot together about the axis 11 when the arm unit 1 is moved forward and backward (i.e., left and right in FIG. 1). However, the inner or steering arm portion 17 additionally is mounted for rotational or twisting movement relative to the outer or drive arm 19 about the axis 21 (see FIG. 5). Consequently, as the entire arm unit 1 is manually manipulated by the wheelchair occupant forward and backward about the axis 11 (i.e., left and right in FIG. 1), the handle portion 23 (see FIG. 5) and attached steering arm 19 can be additionally twisted about the axis 21 relative to the outer drive arm 17.

Steering Arrangement

Figure 6:
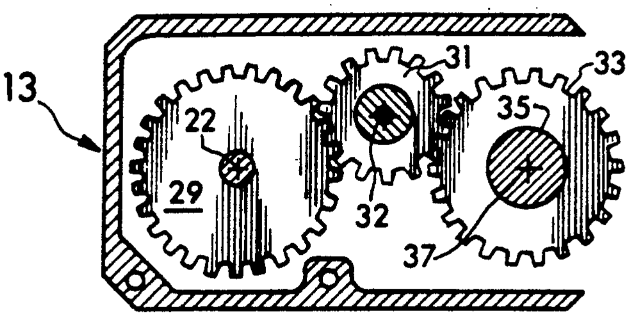
FIG. 6 is a view along line 6—6 of FIG. 5.

The rotational movement of the steering arm portion 19 within the outer, drive arm portion 17 allows the wheelchair 15 to be steered regardless of where or how the entire arm unit 1 is being manipulated. More specifically, and as the handle 23 and steering arm 19 are rotated about the steering arm axis 21 as best illustrated in FIG. 5, the conventional ball and socket arrangement 25 will at all times transfer this rotational movement to the gear box 13 and in particular to the pin 27 on which is mounted the first gear 29. This rotation of gear 29 about its axis 22 then drives the meshing, intermediate gear 31 (see FIG. 6) about its axis 32. This in turn rotates gear 33 and elongated yoke pin 35 about its axis 37 to turn the attached yoke 39 and caster wheel 3 (see FIG. 5) to steer the wheelchair 15 in any desired direction.

Figure 8:
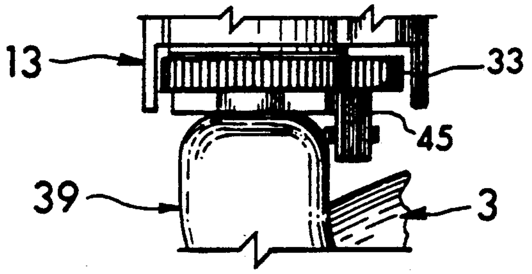
FIG. 8 is a view along line 8—8 of FIG. 7.
Figure 7:
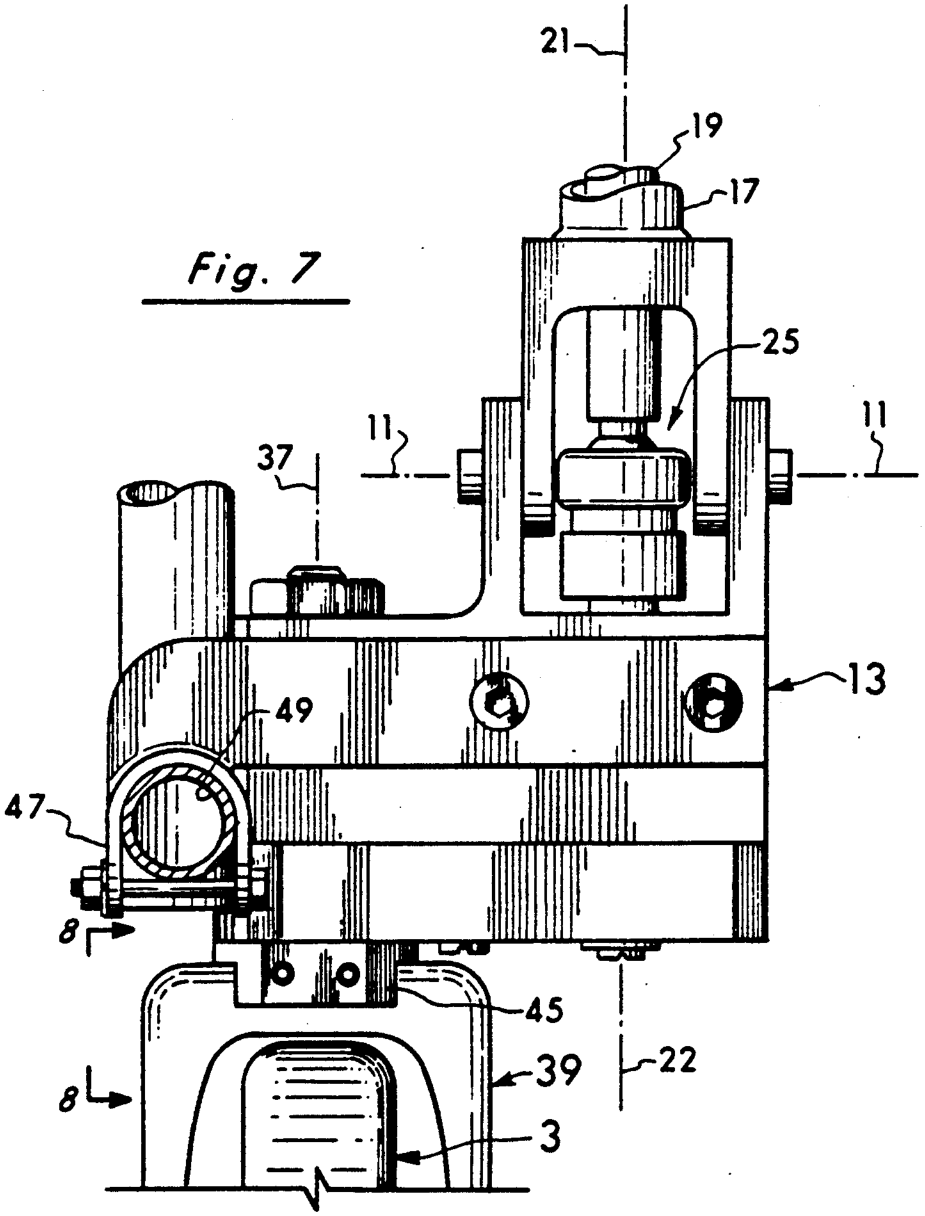
FIG. 7 is a view along line 7—7 of FIG. 1.

Yoke pin 35 in FIG. 5 in most retrofit applications of the present invention will be the original pin for the caster yoke 39 of the wheelchair 15. This feature is illustrative of the ease and simplicity of the retrofitable nature of the present invention. That is, to mount the arm unit 1 to the original structure of the wheelchair 15, it is only necessary to first slide the gear box 13 over the existing bearing housing 41 to the position shown in FIG. 5. Thereafter, one need only loosen nut 43, remove the yoke 39 with its attached pin 35, slide the gear 33 and attached bracket 45 onto the pin 35, and then re-secure the yoke 39 in place with the original nut 43 as shown in FIG. 5. In addition to the gear box 13, the only other non-original equipment in this procedure is then the gear 33 with its attached, depending bracket 45 (which simply serves to prevent the gear 33 from rotating relative to the pin 35 and yoke 39 as illustrated in FIGS. 7 and 8). The gear box 13 itself is held at its rear against rotation about the bearing housing 41 and axis 37 by a simple U-clip 47 (see FIGS. 1 and 7) secured over the horizontal frame member 49 of the wheelchair 15. In most anticipated retrofits, the original yoke pin 35 will be long enough to accommodate the additional thickness of gear 33 and attached angle bracket 45; however, in some cases, it may be necessary to replace the pin 35 with a longer one. Nevertheless, in either case, the retrofit procedure is extremely simple and quick to do.

In use and unlike any prior devices, the steering of the caster yoke 39 of the wheelchair 15 is accomplished by rotating the gear 33 which is symmetrically mounted about the vertical axis 37 of the yoke pin 35. This arrangement is in contrast to prior devices that attempt to steer the yoke 39 by toggle and other arrangements driving off of one of the yoke arms 51. In doing so, such prior devices often result in the creation of dead spots where the yoke 39 cannot be turned when it is in certain positions or cannot always be turned in the desired direction. They also result in the need to use varying amounts of force depending upon how the caster 3 is facing. In contrast, the steering arrangement of the present invention has no dead spots, can always be turned in the desired direction, and requires substantially the same easy force to turn the yoke 39 regardless of which direction the caster 3 is facing.

Figure 9:
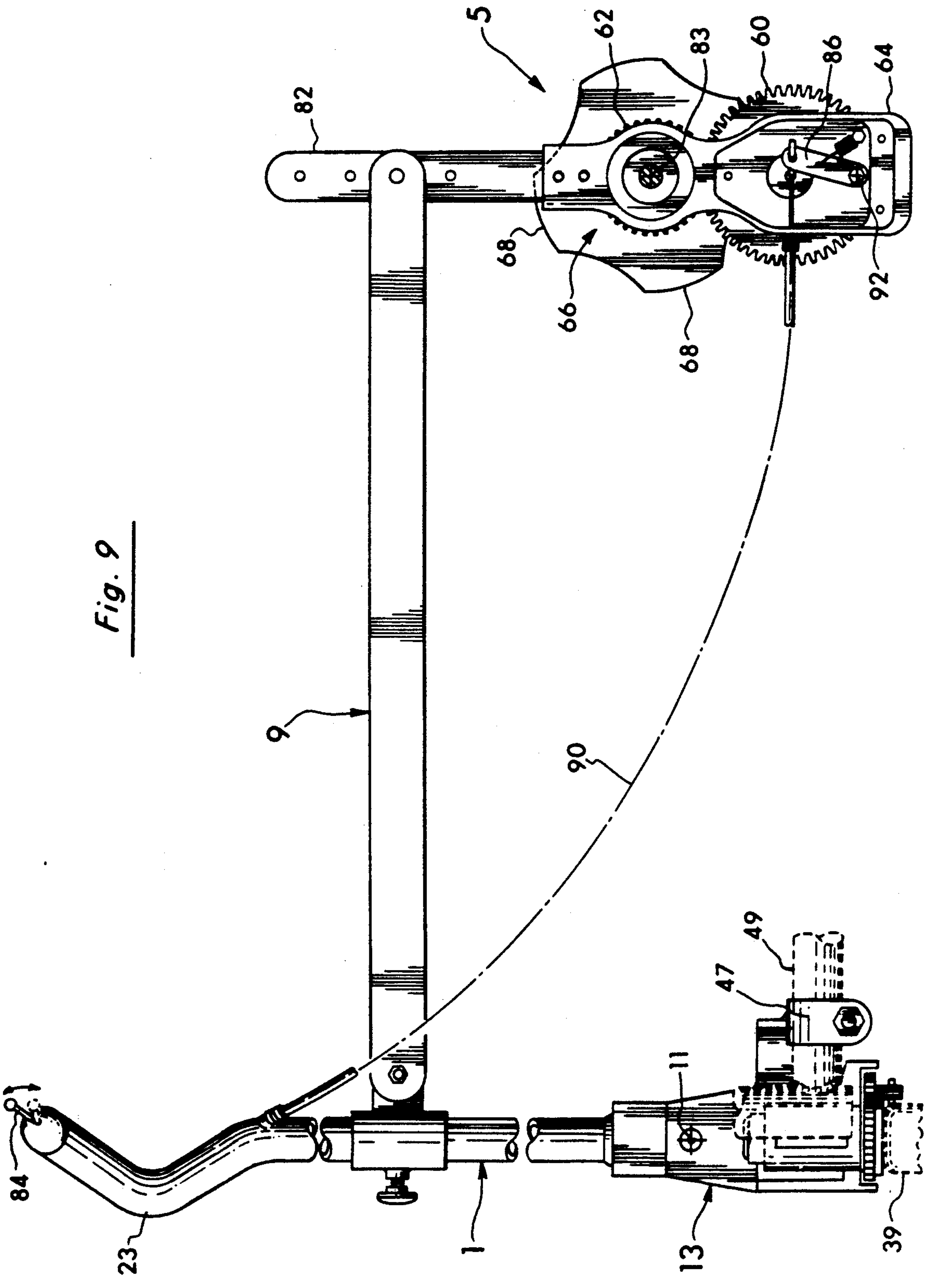
FIG. 9 is a view of the retrofitable attachment itself of the present invention including the elongated arm unit and gear box, rear drive arrangement, and connecting member.

The entire, retrofitable attachment of the present invention is shown in FIG. 9 separate and apart from the wheelchair 15. As shown, it includes the elongated arm unit 1 with gear box 13, connecting number 9, and rear drive arrangement 5. In retrofitting it to the wheelchair 15, the elongated arm unit 1 with gear box 13 can be easily and quickly attached to the frame of the wheelchair 15 as set forth above. Similarly, and with equal ease and speed, the drive arrangement 5 can be attached to the rear wheel 7 of the wheelchair 15 as discussed below.

Rear Drive Arrangement

The rear drive arrangement 5 (see FIG. 2) consists essentially of a reversible ratchet unit with exposed gears 60 and 62, a reversible ratchet control within the housing 64, and an attaching hub member 66 secured to the gear 62. In retrofitting the drive arrangement 5 to the rear wheel 7, the equally spaced arms 68 (see FIG. 10) of the hub member 66 are dimensioned to fit between adjacent pairs of spokes 72 of the rear wheel 7 (see also FIG. 2). In doing so, each arm 68 is received between two of the wheel spokes 72 with the arm edges 74 (see FIG. 10) respectively abutting the planar surfaces 75 of the spokes 72 for a secure fit. In the illustrated embodiments, the rear wheel 7 of the wheelchair 15 is shown with eight spokes 72; however, the present invention is equally adaptable to the other most common wheel design of six spokes or to any other number (e.g., 4–10). With the six spoke wheel, the hub member 66 would preferably have three arms 68 but like the illustrated embodiment of FIG. 10, the arms 68 would still be dimensioned to fit snugly between pairs of spokes 72 with the planar, edge surfaces 74 abutting the planar surfaces 75 of the spokes 72. As shown in FIG. 10, each spoke 72 has two parallel surfaces 75 wherein the surfaces 75 on adjacent spokes 72 face one another and can receive an arm 68 of hub member 66 therebetween.

Figure 11:
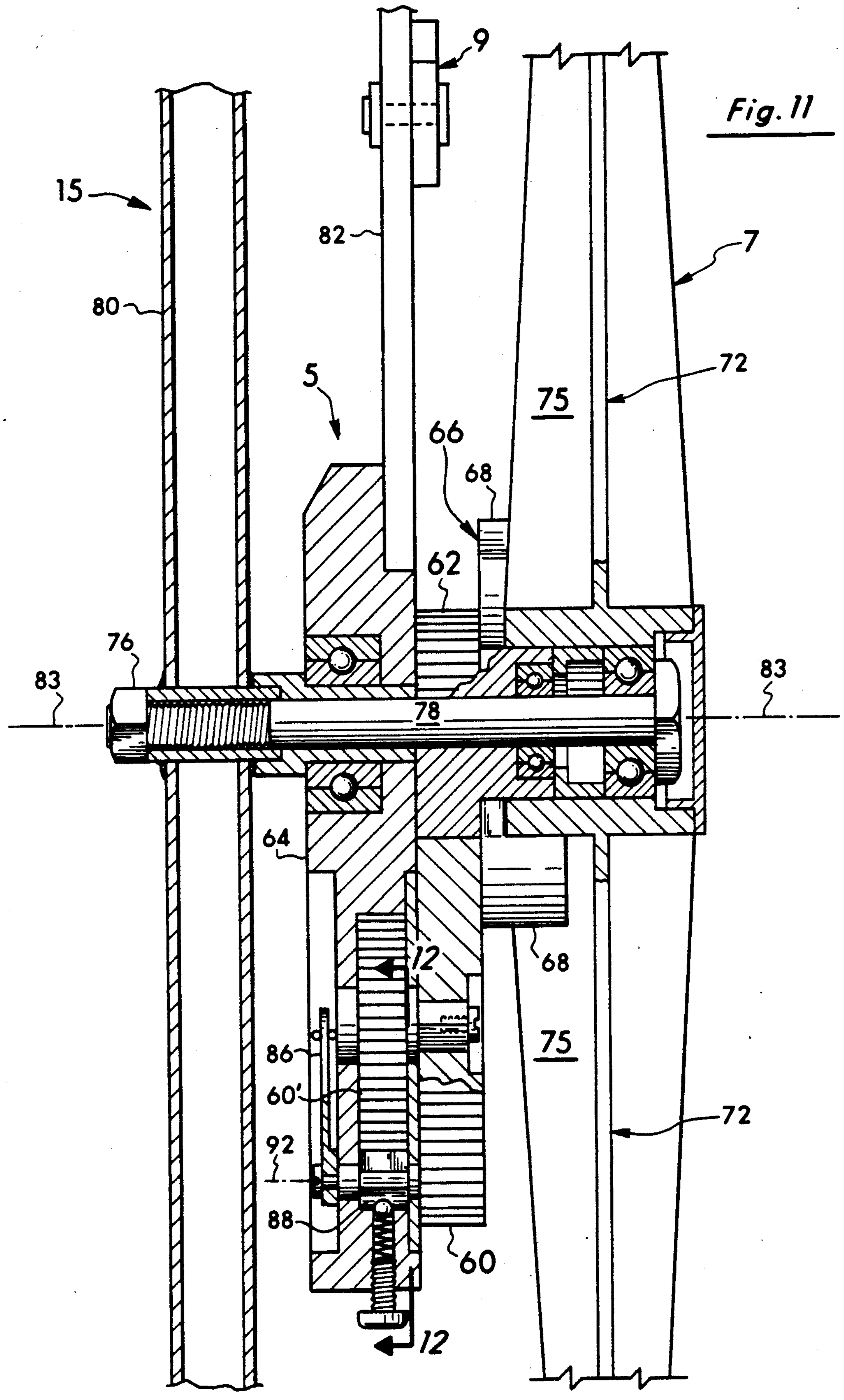
FIG. 11 is a cross-sectional view of the rear drive arrangement attached to the rear wheel.

The completed assembly of the drive arrangement 5 on the rear wheel 7 is best seen in FIG. 11. As shown in FIG. 11 and to accomplish this assembly, it is only necessary to remove the original rear wheel 7 by loosening the axle locknut 76 and then sliding the drive arrangement 5 onto the axle 78 with the arms 68 of the hub member 66 being received between adjacent pairs of spokes 72. The original axle 78 (or a lengthened one if necessary) can then be re-secured to the frame 80 of the wheelchair 15 by re-tightening the axle locknut 76. This then draws the hub member 66 securely into the spokes 72 of the rear wheel 7 and additionally draws and maintains the gears 60 and 62 of the rear drive arrangement 5 into engagement. Thereafter, pivotal or rocking movement of the arm unit 1 about the axis 11 (see FIGS. 1 and 9) will reciprocate the connecting arm 9 back and forth to rotate the upright link 82 (see FIG. 9) of the rear drive arrangement 5 about axis 83 of the rear wheel 7. This in turn will rotate the ratchet housing 64 and attached gear 60 to drive gear 62 and rear wheel 7 of the wheelchair 15.

In this regard, the driven direction of the wheelchair 15 (i.e., forward or reverse) is selectively determinable by manipulating the control lever 84 on the handle 23 in FIG. 1. In the position of FIG. 1, the ratchet member 86 of FIG. 9 will be in the position shown and the interior ratchet pawl 88 (see FIGS. 11 and 12) controlling the engaged versus free ratcheting direction of attached gears 60' and 60 will be in the position of FIGS. 11 and 12. Conversely, to reverse the driven direction of the wheelchair 15, the control lever 84 on the handle 23 is simply moved to the dotted position of FIGS. 3 and 9. This will then activate the cable 90 in FIG. 9 to draw the ratchet member 86 and attached, interior ratchet pawl 88 (see FIG. 12) about axis 92 to the opposite engaging position. Motion of the arm unit 1 about axis 11 will then serve to drive the wheelchair 15 in the reverse direction.

Retrofit Assembly

The retrofit nature and ease and quickness with which it can be done are important elements of the invention and were foremost in mind during its development. As pointed out above, the retrofit procedure in most anticipated applications will use all of the original equipment of the wheelchair and can be accomplished with only the simplest of tools.

For example, assembling the front or steering arrangement of the present invention onto the wheelchair 15 involves only sliding the gear box 13 over the existing housing 41 (see FIG. 5), removing the yoke 39 and attached pin 35 by unscrewing nut 43, sliding the gear 33 and attached bracket 45 onto the pin 35, and re-securing the pin 35 in the housing 41 with nut 43. In this manner, the orthogonal nature of the original equipment has been maintained. That is, the yoke 39 is still mounted to the frame of the wheelchair 15 for rotation about the vertical axis 37 with the axes of the elongated pin 35 coincident with axis 37. Additionally, the axis 94 of the caster wheel 3 is still horizontal and perpendicular to the vertical axis 37. Similarly, the axes of the retrofit unit are in the same orthogonal alignment with axis 11 horizontal and gear axes 22, 32, and 37 vertical. Steering arm 17 at its lower end portion is then mounted to the gear box 13 for pivotal movement about the axis 11 relative to the frame of the wheelchair 15. Further, the steering arm 19 is also mounted by the multi-directional joint 25 for twisting motion about the steering arm axis 21 relative to the gear box 13 and frame of the wheelchair 15. In this manner, the axes 11 and 21 not only intersect but also are perpendicular. Similarly, the vertical axis 22 of the gear 29 intersects axis 11 and is perpendicular to it. Vertical axis 22 also intersects the steering arm axis 21 and when the steering arm 19 is vertical, the axes 21 and 22 are colinear. In use, twisting movement of the handle 23 about axis 21 will then operate through the interconnecting gears 29, 31, and 33 of the gear box 13 to rotate the original yoke pin 35 and yoke 39 about the vertical axis 37.

The original orthogonal alignment of the wheelchair 15 is also maintained by the assembly of the rear drive arrangement 5. This is evident by the simple hub mounting 66 wherein its equally spaced arms 68 are dimensioned to fit between pairs of the outwardly extending, radial spokes 72 of the rear wheel 7. Consequently, to assemble the rear drive 5, it is only necessary to unscrew nut 76 (see FIG. 11), align the axis of the hub member 66 with the axis 83 of the rear wheel 7 and axle 78, move the hub member 66 into the rear wheel 7 with the hub arms 68 interspersed between pairs of spokes 72, and retightened the nut 76 to fixedly attach the hub member 66 to the rear wheel 7. In this assembled position as illustrated in FIG. 11, the axis of the hub member 66 and axis 83 of the rear wheel 7 are colinear. Additionally, the original axis 83 is parallel to the pivotal axis 11 of the elongated arm unit 1 and in keeping with the orthogonal nature of the design, the axes of the drive arm 17 and steering arm 19 are not only colinear with each other but also perpendicular to the axes 11 and 83. Consequently, the overall assembly of the present invention results in a retrofit unit that easily and quickly meshes with the original equipment of the wheelchair while maintaining the operational alignment and integrity of the original equipment of the wheelchair 15. Further, although the retrofitable attachment of the present invention has been shown mounted on the right side of the chair 15, its design is equally adaptable for use on the left side.

While several embodiments of the present invention have been shown and described in detail, it is to be understood that various changes and modifications could be made thereto without departing from the scope of the invention.

We claim:

1. In a wheelchair having a frame, rear wheels, and front casters wherein at least one of said rear wheels has an axis and a plurality of spokes extending radially outwardly of said rear wheel axis, with said spokes being substantially equally spaced from each other about said rear wheel axis, and wherein at least one of said front casters includes a yoke member and caster wheel with the yoke member mounted to said frame for rotation about a first substantially vertical axis and said caster wheel mounted to said yoke member for rotation about a substantially horizontal axis, the improvement including:

a drive arrangement, means for mounting said drive arrangement to said at least one rear wheel, and means for manually activating said drive arrangement to propel said wheelchair wherein said means for mounting said drive arrangement to said rear wheel includes a hub member having an axis and a plurality of arms projecting outwardly of said hub axis with said arms being spaced from each other about said hub axis, the spacing between adjacent arms of said hub member being dimensioned wherein each of said arms is receivable between two of said spokes of said rear wheel, said mounting means further including means for fixedly attaching said hub member to said rear wheel with said rear wheel axis and said hub axis substantially colinear and each of said hub arms respectively received between two of said spokes, said means for activating said drive arrangement to propel said wheelchair including an elongated drive arm extending along an axis and means for mounting said drive arm for pivotal movement about a pivot axis relative to said frame, and steering means for selectively rotating said yoke member of said front caster about said first vertical axis to steer said wheelchair, said steering means including a first gear and means for mounting said first gear substantially symmetrically about said first vertical axis to said yoke member for movement therewith, said steering arm extending along an axis and having two end portions with one end portion having a handle portion, means for mounting said steering arm for rotation about said steering arm axis relative to said drive arm and said frame to rotate said first gear to steer said wheelchair, and means for mounting said steering arm for pivotal movement with said drive arm about the pivot axis of said drive arm wherein said handle portion of said steering arm can be gripped by the occupant of the wheelchair and manually manipulated about said pivot axis with said drive arm to propel said wheelchair and manipulated about said steering arm axis relative to said drive arm and said frame to steer said wheelchair.

2. The improvement of claim 1 wherein the axes of said drive arm and said steering arm are substantially colinear.

3. The improvement of claim 2 wherein said pivot axis is substantially perpendicular to the colinear axes of said drive and steering arms.

4. The improvement of claim 1 wherein said pivot axis is substantially perpendicular to said drive arm axis and said steering arm axis.

5. The improvement of claim 1 further including means extending between said drive arrangement and the handle portion of said steering arm for reversing the direction of propulsion of said wheelchair by said drive arrangement.

6. A method for retrofitting a wheelchair with a drive arrangement and an elongated steering arm wherein the wheelchair prior to retrofitting has a frame, rear wheels, and front casters with at least one of said front casters having a yoke member and caster wheel with the yoke member mounted to the frame for rotation about a first, substantially vertical axis by an elongated pin extending along a pin axis coincident with said first axis, said pin being mounted to said frame for rotation relative to said frame about said first axis and said pin further being fixedly attached to said yoke member, and said caster wheel being mounted to said yoke member for rotation about a substantially horizontal axis and wherein at least one of said rear wheels has an axis and a plurality of spokes extending radially outwardly of said rear wheel axis with said spokes being substantially equally spaced from each other about said rear wheel axis, the method including the steps of:

(a) removing said at least one rear wheel and said yoke member and pin from said frame, (b) providing a drive arrangement with a hub member with an axis and having a plurality of arms projecting outwardly of said hub axis with said arms being spaced from each other about said hub axis, the spacing between adjacent arms of said hub member being dimensioned wherein each of said arms is receivable between two of said spokes of said rear wheel, (c) providing an elongated drive arm and steering arm extending along respective axes, (d) mounting a first gear to said pin substantially symmetrically about said pin axis for rotation with said pin about said pin axis, (e) re-securing said rear wheel to said frame with said hub member fixedly attached to said rear wheel with said hub and rear wheel axes substantially colinear and each of said hub arms respectively received between two of said spokes, (f) re-securing said yoke member and said pin with said first gear mounted thereto to said frame for rotation about said first vertical axis, (g) mounting said drive arm and said steering arm for pivotal movement relative to said frame about a pivot axis and mounting said steering arm for rotational movement about said steering arm axis relative to said drive arm and said frame, (h) interconnecting said drive arm and said drive arrangement wherein pivotal movement of said drive arm about said pivot axis activates said drive arrangement to propel said wheelchair, and (i) interconnecting said steering arm and said first gear wherein rotation of said steering arm about said steering arm axis rotates said first gear and attached yoke member about said first axis to steer said wheelchair.

7. The method of claim 6 further including the limitation of aligning said drive arm axis and said steering arm axis substantially colinear.

8. The method of claim 7 further including the limitation of aligning said pivot axis substantially perpendicular to said colinear axes of said drive arm and said steering arm.

9. The method of claim 6 further including the limitation of aligning said pivot axis substantially perpendicular to the drive arm axis and the steering arm axis.

10. The method of claim 6 further including the step of providing means for reversing the direction of propulsion of said wheelchair by said drive arrangement.

11. In a wheelchair having a frame, rear wheels, and front casters wherein at least one of said rear wheels has a plurality of spokes extending radially outwardly of a first axis with said spokes being substantially equally spaced from each other about said first axis, the improvement including:

a drive arrangement, means for mounting said drive arrangement to said at least one rear wheel, and means for manually activating said drive arrangement to propel said wheelchair wherein said means for mounting said drive arrangement to said rear wheel includes a hub member having a plurality of arms projecting outwardly of a second axis with said arms being spaced from each other about said second axis, the spacing between adjacent arms of said hub member being dimensioned wherein each of said arms is receivable between two of said spokes of said rear wheel, said mounting means further including means for fixedly attaching said hub member to said rear wheel with said first and second axes substantially colinear and each of said hub arms respectively received between two of said spokes.

12. The improvement of claim 11 wherein said means for fixedly attaching said hub member to said rear wheel includes an axle member and means for attaching said axle member to said frame along the colinear first and second axes with said rear wheel and said drive arrangement including said hub member mounted about said axle member.

13. The improvement of claim 12 wherein said drive arrangement includes a ratchet assembly with at least one driven and one driving gear wherein said driven gear is fixedly attached to said hub member and extends substantially symmetrically about said second axis.

14. The improvement of claim 11 wherein said arms of said hub member are substantially equally spaced from each other about said second axis.

15. The improvement of claim 11 wherein said means for activating said drive arrangement includes an elongated drive arm, means for mounting said drive arm for pivotal movement about a pivot axis, and means for interconnecting said drive arm and said drive arrangement wherein pivotal movement of said drive arm about said pivot axis activates said drive arrangement to propel said wheelchair.

16. The improvement of claim 11 wherein each spoke of said rear wheel has first and second substantially planar and parallel surfaces extending outwardly of said first axis with the first planar surface of each spoke substantially facing the second planar surface of an adjacent spoke and each arm of said hub member has first and second substantially planar surfaces wherein said first and second surfaces of each arm substantially abut the respective first surface of one spoke ad the second surface of an adjacent spoke when said hub member is fixedly attached to said rear wheel.

17. The improvement of claim 11 wherein said rear wheel has no more than ten spokes.

18. The improvement of claim 11 wherein said rear wheel has between four and ten spokes.

19. The improvement of claim 11 wherein at least one of said front casters includes a yoke member and caster wheel with the yoke member mounted to said frame for rotation about a first, substantially vertical axis and said caster wheel mounted to said yoke member for rotation about a substantially horizontal axis, the improvement further including:

steering means for selectively rotating said first member about said first vertical axis to steer said wheelchair said steering means including a first gear and means for mounting said first gear substantially symmetrically about said first vertical axis to said yoke member for movement therewith.

20. The improvement of claim 19 wherein said steering means for said yoke member further includes at least a second gear, means for mounting said second gear for rotation about a second axis spaced from said first vertical axis with said first and second gears in a meshing engagement, and means for selectively rotating said second gear about said second axis to rotate said first gear and said yoke member about said first vertical axis.

21. The improvement of claim 20 wherein said steering means for rotating said second gear includes an elongated steering arm extending along an axis and having two end portions with one end portion having a handle and means for mounting the second end portion thereof adjacent said second gear, said mounting means for said second end portion of said steering arm mounting said steering arm for rotation about said arm axis relative to said frame.

22. The improvement of claim 21 wherein said mounting means for said second end portion of said steering arm includes a third gear and means for mounting said third gear for rotation about a third axis spaced from said first and second axes with said second and third gears in a meshing engagement wherein rotation of said steering arm about said arm axis will rotate said third gear about said third axis which in turn will rotate said second gear about said second axis and said first gear and yoke member about said first axis.

23. The improvement of claim 22 wherein said mounting means for said second end portion of said steering arm includes a multi-directional joint wherein said steering arm can be moved relative to said mounting means about said arm axis and about a pivot axis substantially perpendicular to said arm axis.

24. The improvement of claim 23 wherein said wheelchair further includes a drive arrangement for one of said rear wheels and connecting means extending between said drive arrangement and said steering arm wherein pivotal movement of said steering arm about said pivot axis activates said drive arrangement to propel said wheelchair and movement of said steering arm about said arm axis rotates said yoke member of said front caster about said first axis to steer said wheelchair.

25. The improvement of claim 24 wherein said wheelchair further includes means extending between said steering arm and said drive arrangement for reversing the direction of propulsion of said wheelchair by said drive arrangement.

26. The improvement of claim 22 wherein said arm axis and said third axis intercept.

27. The improvement of claim 26 wherein said arm axis, third axis, and pivot axis intercept.

28. The improvement of claim 22 wherein said first, second, and third axis are substantially parallel.

29. The improvement of claim 20 wherein said first and second axes are substantially parallel.

30. A method for retrofitting a wheelchair with a drive arrangement wherein the wheelchair prior to retrofitting has a frame, rear wheels, and front casters with at least one of said rear wheels being secured to said frame and having a plurality of spokes extending radially outwardly of a first axis with said spokes being substantially equally spaced from each other about said first axis, the method including the steps of:

(a) removing said at least one rear wheel from said frame, (b) providing a drive arrangement with a hub member having a plurality of arms projecting outwardly of a second axis with said arms being spaced from each other about said second axis, the spacing between adjacent arms of said hub member being dimensioned wherein each of said arms is receivable between two of said spokes of said rear wheel, and (c) re-securing said rear wheel to said frame with said hub member fixedly attached to said rear wheel with said first and second axes substantially colinear and each of said hub arms respectively received between two of said spokes.

31. The method of claim 30 wherein step (c) includes the further limitation of re-securing said rear wheel to said frame by positioning each of said hub arms respectively between two of said spokes with said hub member substantially between said rear wheel and said frame and drawing said rear wheel and said frame toward each other along said colinear first and second axes.

* * * * *